United States Patent
Reynolds

(10) Patent No.: US 7,577,935 B2
(45) Date of Patent: Aug. 18, 2009

(54) GENERATIVE PROGRAMMING SYSTEM AND METHOD EMPLOYING FOCUSED GRAMMARS

(75) Inventor: Matthew T. Reynolds, 11487 Oralane Dr., El Cajon, CA (US) 92020-8244

(73) Assignee: Matthew T. Reynolds, San Diego, CA (US)

( * ) Notice: Subject to any disclaimer, the term of this patent is extended or adjusted under 35 U.S.C. 154(b) by 545 days.

(21) Appl. No.: 11/045,928

(22) Filed: Jan. 28, 2005

(65) Prior Publication Data

US 2005/0183073 A1    Aug. 18, 2005

Related U.S. Application Data

(60) Provisional application No. 60/544,953, filed on Feb. 14, 2004.

(51) Int. Cl.
*G06F 9/44* (2006.01)
(52) U.S. Cl. .................................. 717/106; 717/107
(58) Field of Classification Search ................ 717/106, 717/107, 108, 109
See application file for complete search history.

(56) References Cited

U.S. PATENT DOCUMENTS

| | | | | |
|---|---|---|---|---|
| 4,935,877 A * | 6/1990 | Koza | ........................... | 706/13 |
| 5,754,860 A * | 5/1998 | McKeeman et al. | .......... | 717/124 |
| 6,083,276 A * | 7/2000 | Davidson et al. | ............. | 717/107 |
| 6,246,403 B1 * | 6/2001 | Tomm | ........................ | 715/762 |
| 6,549,943 B1 * | 4/2003 | Spring | ........................ | 709/223 |
| 6,634,019 B1 * | 10/2003 | Rice et al. | .................... | 717/127 |
| 6,754,703 B1 * | 6/2004 | Spring | ........................ | 709/223 |
| 6,954,747 B1 * | 10/2005 | Wang et al. | .................... | 706/54 |
| 6,990,654 B2 * | 1/2006 | Carroll, Jr. | ................... | 717/109 |
| 2003/0200533 A1 * | 10/2003 | Roberts et al. | .............. | 717/124 |
| 2004/0153995 A1 * | 8/2004 | Polonovski | ................. | 717/113 |

OTHER PUBLICATIONS

Czarnecki, Krzystof. "Components and Generative Programming." Foundations of Software Engineering: Proceedings of the 7th European software engineering conference held jointly with the 7th ACM SIGSOFT international symposium on Foundations of software engineering (1999): 2-19.*

(Continued)

*Primary Examiner*—Wei Y Zhen
*Assistant Examiner*—Matthew J Brophy
(74) *Attorney, Agent, or Firm*—Kenyon & Kenyon LLP

(57) ABSTRACT

A system and method may employ focused grammars to facilitate automated generation of computer programs. Such implementation of focused grammars enables a new form of symbolic regression referred to as generative programming or automated programming. The search through the space of possible programs may be guided by a streak search method in accordance with which identified candidate programs that improve on the current streak may be used to create focused grammars for directing an additional localized search. In some embodiments, candidate programs are generated by randomly traversing focused grammars from the starting rule, and subsequently through the grammars, until a complete candidate program parse tree has been constructed. Candidate programs may then be executed, for example, by an evaluator, which may employ an interpreter adapted for use in conjunction with a Stack Manipulation Language or other interpreted language.

19 Claims, 8 Drawing Sheets

OTHER PUBLICATIONS

Ratle, Alain, Sebag, Michele. "A Novel Approach to Machine Discovery: Genetice Programming and Stochastic Grammars." Proceedings from the 12th international Conference on Inductive Logic Programming 12(2002): 207-222.*

Conor Ryan, et al. "Grammatical Evolution: Evolving Programs for an Arbitrary Language." Department of Computer Science and Information Systems, University of Limerick, 1998.*

John R. Koza, "Genetic Programming: A Paradigm for Genetically Breeding Populations of Computer Programs to Solve Problems", Computer Science Department, Stanford University, Jun. 1990.

John R. Koza, "Hierarchical Genetic Algorithms Operating on Populations of Computer Programs", Computer Science Department, Stanford University, 1989.

Candida Ferreira, "Gene Expressing Programming: A New Adaptive Algorithm for Solving Problems", Complex Systems, vol. 13, issue 2:87-129, 2001.

P.A. Whigham, "Inductive Bias and Genetic Programming", "First International Conference on Genetic Algorithms in Engineering Systems: Innovations and Applications, {GALESIA}", vol. 414, 12-14, pp. 461-466, IEE, Sheffield, UK, 1995.

Rafal Salustowicz and Jürgen Schmidhuber, "Probabilistic Incremental Program Evolution" "Evolutionary Computation", 5 (2): 123-141, 1997.

* cited by examiner

Descriptive Grammar

| Rules | | Production | Production Probabilities |
|---|---|---|---|
| <city description>* | ::= | <city> " is " <assertion> " . " | 1.00 |
| <assertion> | ::= | <description> | 0.50 |
| | \| | <description> <conjunction> | 0.50 |
| <conjunction> | ::= | " and " <description> | 0.50 |
| | \| | " , " <description> <conjunction> | 0.50 |
| <city> | ::= | "San Diego" | 0.33 |
| | \| | "Los Angeles" | 0.33 |
| | \| | "Paris" | 0.33 |
| <description> | ::= | "hot" | 0.25 |
| | \| | "crowded" | 0.25 |
| | \| | "fun" | 0.25 |
| | \| | "beautiful" | 0.25 |

\* Starting rule.

FIG. 4

Generating A Candidate Program

| Step# | Expanding Rule | Rnd# | Prod# | Sentence | Distance |
|---|---|---|---|---|---|
| 1 | <city description> | 0.55 | 1 | <city> " is " <assertion> " . " | 1 |
| 2 | <city> | 0.28 | 1 | "San Diego is " <assertion> " . " | 3 |
| 3 | <assertion> | 0.67 | 2 | "San Diego is " <description> <conjunction> " . " | 2 |
| 4 | <description> | 0.14 | 1 | "San Diego is hot " <conjunction> " . " | 4 |
| 5 | <conjunction> | 0.89 | 2 | "San Diego is hot, " <description> <conjunction> " . " | 2 |
| 6 | <description> | 0.71 | 3 | "San Diego is hot, fun " <conjunction> " . " | 4 |
| 7 | <conjunction> | 0.43 | 1 | "San Diego is hot, fun and " <description> " . " | 2 |
| 8 | <description> | 0.92 | 4 | "San Diego is hot, fun and beautiful." | 4 |

Candidate Program = "San Diego is hot, fun and beautiful."   22

FIG. 5

Focused Grammar – Equiprobable

| Rules | ADV | ADF | Productions | Production Probabilities |
|---|---|---|---|---|
| <city description>* = | | | <city> " is " <assertion> " . " | 0.50 |
|  ; | | 1 | <city> " is " <description> <conjunction> " . " | 0.50 |
| <assertion> = | | | <description> | 0.25 |
|  | | | <description> <conjunction> | 0.25 |
|  ; | 3 | 3 | <description> " , " <description> <conjunction> | 0.25 |
|  | | | "hot, fun and beautiful" | 0.25 |
| <conjunction> = | | | " and " <description> | 0.20 |
|  | | | " , " <description> <conjunction> | 0.20 |
|  | 5 | 5 | " , " <description> " and " <description> | 0.20 |
|  | 7 | | " , fun and beautiful " | 0.20 |
|  ; | | | " and beautiful " | 0.20 |
| <city> = | | | "San Diego" | 0.25 |
|  | | | "Los Angeles" | 0.25 |
|  | 5 | | "Paris" | 0.25 |
|  ; | 2 | | "San Diego" | 0.25 |
| <description> = | | | "hot" | 0.14 |
|  | | | "crowded" | 0.14 |
|  | 4 | | "fun" | 0.14 |
|  | 6 | | "beautiful" | 0.14 |
|  | 8 | | "hot" | 0.14 |
|  | | | "fun" | 0.14 |
|  ; | | | "beautiful" | 0.14 |

* Starting rule.

FIG. 6

Focused Grammar – Shaped for Reuse

| Rules | ADV | ADF | Productions | Distance | 1/Distance | Probability |
|---|---|---|---|---|---|---|
| <city description>* ::= | | | <city> " is " <assertion> " . " | 1 | 1.000 | 0.500 |
| | | 1 | <city> " is " <description> <conjunction> " . " | 1 | 1.000 | 0.500 |
| <assertion> ::= | | | <description> | 2 | 0.500 | 0.300 |
| | | | <description> <conjunction> | 2 | 0.500 | 0.300 |
| | 3 | 3 | <description> " , " <description> <conjunction> | 2 | 0.500 | 0.300 |
| | | | " hot, fun and beautiful " | 6 | 0.167 | 0.100 |
| <conjunction> ::= | | | " and " <description> | 2 | 0.500 | 0.301 |
| | | | " , " <description> <conjunction> | 2 | 0.500 | 0.301 |
| | 5 | 5 | " , " <description> " and " <description> | 2 | 0.500 | 0.301 |
| | | | " , fun and beautiful " | 10 | 0.100 | 0.060 |
| | 7 | | " and beautiful " | 16 | 0.063 | 0.038 |
| <city> ::= | | | "San Diego" | 3 | 0.333 | 0.317 |
| | | | "Los Angeles" | 3 | 0.333 | 0.317 |
| | 2 | | "Paris" | 3 | 0.333 | 0.317 |
| | | | "San Diego" | 19 | 0.053 | 0.050 |
| <description> ::= | | | "hot" | 4 | 0.250 | 0.214 |
| | | | "crowded" | 4 | 0.250 | 0.214 |
| | 4 | | "fun" | 4 | 0.250 | 0.214 |
| | 6 | | "beautiful" | 4 | 0.250 | 0.214 |
| | 8 | | "hot" | 18 | 0.056 | 0.048 |
| | | | "fun" | 18 | 0.056 | 0.048 |
| | | | "beautiful" | 18 | 0.056 | 0.048 |

* Starting rule.

FIG. 7

Focused Grammar – Shaped for Similar Termination

| Rules | | ADV | ADF | Productions | Distance | 1/Distance | Probability |
|---|---|---|---|---|---|---|---|
| <city description>* | = | 1 | | <city> " is " <assertion> " . " | 1 | 1.000 | 0.500 |
|  | ; |  |  | <city> " is " <description> <conjunction> " . " | 1 | 1.000 | 0.500 |
| <assertion> | = | 3 | 3 | <description> | 2 | 0.500 | 0.320 |
|  |  |  |  | <description> <conjunction> | 2 | 0.500 | 0.320 |
|  |  |  |  | <description> " , " <description> <conjunction> | 2 | 0.500 | 0.320 |
|  | ; |  |  | " hot, fun and beautiful " | 16 | 0.063 | 0.040 |
| <conjunction> | = | 5 | 5 | " and " <description> | 2 | 0.500 | 0.286 |
|  |  |  |  | " , " <description> <conjunction> | 2 | 0.500 | 0.286 |
|  |  |  |  | " , " <description> " and " <description> | 2 | 0.500 | 0.286 |
|  |  |  |  | " , fun and beautiful " | 12 | 0.083 | 0.048 |
|  | ; |  |  | " and beautiful " | 6 | 0.167 | 0.095 |
| <city> | = | 2 | 2 | "San Diego" | 3 | 0.333 | 0.250 |
|  |  |  |  | "Los Angeles" | 3 | 0.333 | 0.250 |
|  |  |  |  | "Paris" | 3 | 0.333 | 0.250 |
|  | ; |  |  | "San Diego" | 3 | 0.333 | 0.250 |
| <description> | = | 4 | 8 | "hot" | 4 | 0.250 | 0.143 |
|  |  | 6 |  | "crowded" | 4 | 0.250 | 0.143 |
|  |  | 8 |  | "fun" | 4 | 0.250 | 0.143 |
|  |  |  |  | "beautiful" | 4 | 0.250 | 0.143 |
|  |  |  |  | "hot" | 4 | 0.250 | 0.143 |
|  |  |  |  | "fun" | 4 | 0.250 | 0.143 |
|  | ; |  |  | "beautiful" | 4 | 0.250 | 0.143 |

* Starting rule.

FIG. 8

GENERATIVE PROGRAMMING SYSTEM AND METHOD EMPLOYING FOCUSED GRAMMARS

CROSS-REFERENCE TO RELATED APPLICATIONS

The present application claims the benefit of U.S. provisional application Ser. No. 60/544,953, filed Feb. 14, 2004, entitled "GENERATIVE PROGRAMMING THROUGH FOCUSED GRAMMARS: A NEW METHOD OF AUTOMATED PROGRAMMING."

BACKGROUND

1. Field of the Invention

Aspects of the present invention relate generally to advanced symbolic regression programming techniques, and more particularly to a system and method of generative programming which employ focused grammars to facilitate automated generation of computer programs or computerized or electronic solutions.

2. Description of Related Art

Conventional recursive analysis technologies and symbolic regression techniques suffer from various shortcomings. Briefly, traditional strategies invoke repetitive computational processes to generate great numbers of candidate programs and to evaluate those candidate programs as a means of identifying a single program or a set of programs exhibiting acceptable performance levels with respect to a given evaluation scheme.

Conventional methods employing random searches to identify good candidate solutions are deficient to the extent that they tend not address local search areas, i.e., areas within the search space in the vicinity of, or proximate to, other good candidate solutions. Conversely, genetic programming techniques, while potentially adept at localized searches, are deficient to the extent that the algorithms employed may get caught in local minima to the exclusion of broader, more promising search directions.

SUMMARY

Embodiments of the present invention overcome the above-mentioned and various other shortcomings of conventional technology, providing a system and method of generative programming which employ focused grammars to facilitate automated generation of computer programs or computerized or electronic solutions.

In one exemplary embodiment, a method of generative programming may generally comprise: receiving a grammar defining variable parameters; generating a candidate program using the grammar; evaluating the candidate program in accordance with predetermined criteria; and selectively repeating the generating and the evaluating. Some such methods may further comprise continuing the selectively repeating until an optimal candidate program is identified in accordance with the evaluating.

In accordance with some embodiments, the evaluating comprises executing the candidate program and assigning a score; the executing may comprise employing an interpreter. As set forth in detail below, a method of generative programming may further comprise designating a selected candidate program as a modulating program. The designating may be executed in accordance with the assigning. An exemplary method further comprises selectively modifying the grammar using the modulating program.

In accordance with another embodiment, a method of generative programming utilizing focused grammars may comprise: receiving a grammar defining variable parameters; generating a candidate program using the grammar; evaluating the candidate program in accordance with predetermined criteria; modifying the grammar; and selectively repeating the generating, the evaluating, and the modifying. The modifying may be responsive to the evaluating or to some other criteria.

Some such methods may further comprise continuing the selectively repeating until an optimal candidate program is identified in accordance with the evaluating. In accordance with one exemplary method, the evaluating comprises executing the candidate program and assigning a score; as noted above, the executing may comprise employing an interpreter.

In accordance with another embodiment, a computer-readable medium encoded with data and instructions for enabling generative programming utilizing focused grammars may cause an apparatus executing the instructions to: receive a grammar defining variable parameters; generate a candidate program using the grammar; evaluate the candidate program in accordance with predetermined criteria; and create a focused grammar in accordance with results of the evaluation. The computer-readable medium may be further encoded with data and instructions and further cause an apparatus executing the instructions to implement the focused grammar to generate an additional candidate program.

As set forth in more detail below, an exemplary generative programming system may generally comprise: a grammar module operative to establish a grammar; a program generator operative to generate a candidate program in accordance with the grammar; and an evaluator operative to evaluate the candidate program in accordance with predetermined criteria.

In some systems, the evaluator is further operative to execute the candidate program in a simulated environment and to assign a score to the candidate program. The evaluator may comprise an interpreter operative in accordance with an interpreted programming language.

Exemplary systems are disclosed wherein the evaluator is further operative to provide data associated with an evaluation to the program generator; in one such embodiment, the program generator is further operative to provide the data to the grammar module. The grammar module may be further operative to modify the grammar responsive to the data.

The foregoing and other aspects of various embodiments of the present invention will be apparent through examination of the following detailed description thereof in conjunction with the accompanying drawing figures.

BRIEF DESCRIPTION OF THE DRAWING FIGURES

FIG. 4 is a simplified diagram illustrating one embodiment of a descriptive grammar.

FIG. 5 is a simplified diagram illustrating the general operation of one embodiment of a method which employs a grammar in generating a candidate program.

FIG. 6 is a simplified diagram illustrating one embodiment of an equiprobable focused grammar.

FIG. 7 is a simplified diagram illustrating one embodiment of a focused grammar shaped for reuse.

FIG. 8 is a simplified diagram illustrating one embodiment of a focused grammar shaped for similar termination.

DETAILED DESCRIPTION

Figure 2:
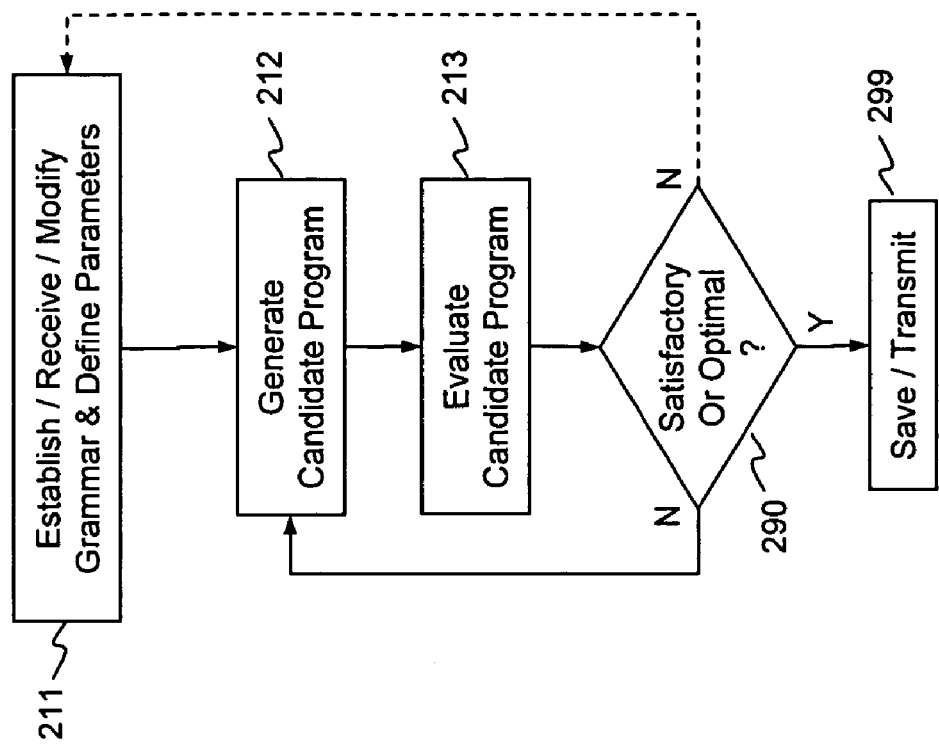
FIG. 2 is a simplified flow diagram illustrating the general operational flow of exemplary embodiments of a generative programming method.

In the context of the present application, the terms "automated programming" and "generative programming" generally refer to any of several embodiments of a process of generating candidate "programs" or candidate "solutions" and of scoring, ranking, classifying, or otherwise evaluating those candidate solutions, such as relative to other candidate solutions, for instance, or objectively in accordance with predetermined criteria. Specifically, the generative programming techniques set forth herein represent a highly evolved form of symbolic regression analysis, in accordance with which great numbers of candidate solutions may be "randomly" generated in focused directions in accordance with rules and variable parameters specified in one or more grammars. Each respective candidate solution or candidate program may be measured or otherwise evaluated, for example, to determine performance characteristics with respect to a desired, required, or otherwise specified objective function. As set forth in more detail below, the term "solution" as employed herein may be analogous to the term "program;" it will be appreciated that the scope of the present disclosure is not limited to, and neither the term "program" nor the term "solution" is intended to imply, computer executable programming code to the exclusion of other possibilities.

Candidate programs that perform well may be, for example, saved for future use or processing, modified in an attempt to improve performance, employed to create one or more focused grammars as set forth below, or some combination thereof. Conversely, candidate programs that perform poorly may be discarded or ignored; in some embodiments, even poorly performing candidate programs may be used to create one or more focused grammars which may influence subsequent searches. Accordingly, a system and method of generative programming configured and operative in accordance with the present disclosure may search through a large universe (or "space") of possible solutions. Given sufficient computational time, good candidate programs (i.e., those that perform well as measured by predetermined criteria) may be generated and identified. As set forth in more detail below, feedback from performance evaluations of previously generated candidate programs may facilitate construction of new focused grammars operative to guide the search for additional or improved candidate programs in promising directions.

It will be appreciated by those of skill in the art that generative programming approaches are viable (and particularly efficient in some instances), at least in part, due to the ever increasing speed of the modern computer. Today's computers are capable of executing billions of calculations per second, and every new generation of computers can process more data, and at a faster rate, than the previous generation—a trend that promises to enable generative programming strategies to become increasingly more capable over time. In that regard, the exemplary generative programming methodologies described herein may be maximized or facilitated by substantial data processing capacity or bandwidth, i.e., a capability to evaluate great numbers of candidate programs quickly and automatically.

Figure 1:
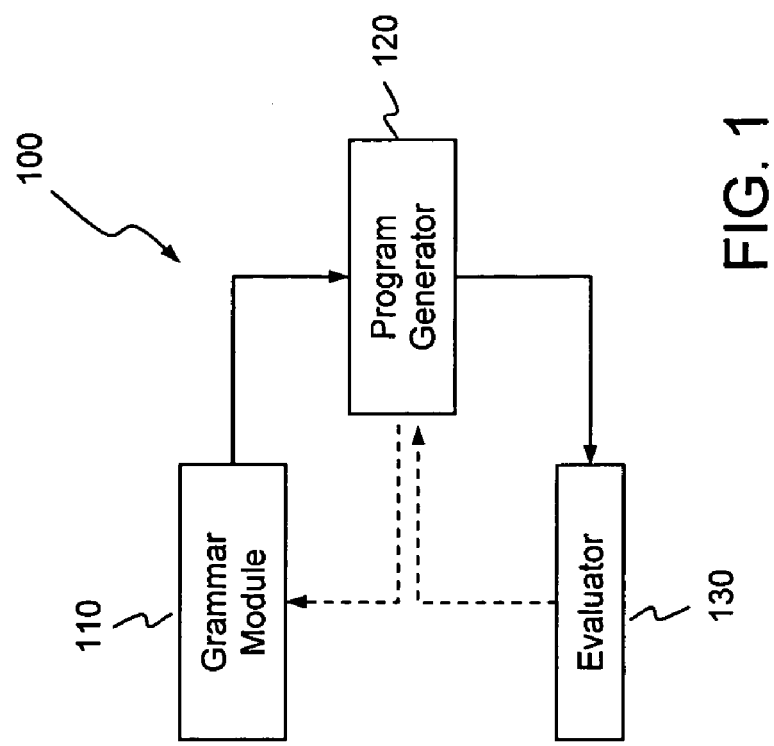
FIG. 1 is a simplified high level block diagram illustrating components of one embodiment of a generative programming system.

Turning now to the drawing figures, FIG. 1 is a simplified high level block diagram illustrating components of one embodiment of a generative programming system. As illustrated in FIG. 1, an exemplary generative programming system 100 may generally comprise a grammar module 110, a program generator 120, and an evaluator 130.

Grammar module 110 may generally define a search space, i.e., the universe of possible candidate programs that may be generated. In that regard, grammar module 110 may be characterized as receiving, establishing, or modifying a grammar comprising a set of rules defining variable parameters as described in more detail below. These variable parameters may be associated with the problem a generated candidate program is intended to solve, for instance, or may otherwise affect candidate program structure and functionality. In some embodiments, grammar module 110 may initially employ a "base grammar" that is user-defined or otherwise specified in accordance with user input. Additionally, grammar module 110 may dynamically modify or otherwise reconfigure (i.e., focus) grammars as the search for improved candidate programs progresses; such modification may be responsive to feedback from program generator 120 (indicated by the dashed arrow in FIG. 1). In that regard, an exemplary grammar received, established, modified, or otherwise generated by grammar module 110, either independently or in cooperation with program generator 120, may be stochastic, i.e., characterized by some degree of randomness which may be affected or influenced by some predefined or dynamically adjusted statistical probability as set forth in more detail below.

Program generator 120 may generally be configured and operative to construct valid candidate programs using rules and variable parameters prescribed by a grammar supplied by grammar module 110; program generator 120 may execute this functionality independently, for example, or in combination with one or more processing systems as described below with reference to FIG. 3. In the FIG. 1 arrangement, program generator 120 may transmit generated candidate programs to evaluator 130, for example, for execution and evaluation. Specifically, evaluator 130 (either independently or in combination with one or more processing systems) may generally be configured and operative to execute candidate programs and to assign a score or weight to each candidate program; such a score or weight may represent a respective fitness or suitability of each respective candidate program. A candidate program's suitability in this context may be measured in accordance with user-defined or other predetermined criteria including, but not limited to: accuracy with respect to modeling (i.e., estimating) or solving the problem at hand; computational overhead or load management considerations; speed of execution or expected cycles to solution; or some combination of these and other factors.

As indicated by the dashed arrow in FIG. 1, program generator 120 may employ feedback from evaluator 130 (e.g., regarding the suitability or operational run-time characteristics of respective candidate programs) in generating subsequent or additional candidate programs, in providing information to grammar module 110 for dynamic modification of subsequent focused grammars, or both. Specifically, evaluator 130 may be configured and operative to provide data associated with an evaluation of a candidate program to program generator 120. Provision of such data may be responsive to a request transmitted from program generator 120, for example; additionally or alternatively, data associated with an evaluation may be provided to program generator 120 unbidden or automatically in accordance with predetermined occurrences or satisfaction of other specified criteria.

In the foregoing manner, and as generally depicted in FIG. 2, candidate programs may be generated and scored or evaluated repeatedly, such as for a predetermined number of iterations, for instance, or until a candidate program has been generated that achieves satisfactory performance or satisfies some objective performance characteristic threshold. In that regard, FIG. 2 is a simplified flow diagram illustrating the general operational flow of exemplary embodiments of a generative programming method.

A grammar of rules, which defines variable parameters governing generation of a candidate program, may be received or established as indicated at block 211. As noted briefly above and discussed in more detail below, the grammar, at least initially, may be user-specified; in some embodiments, the grammar may be dynamically adjusted or otherwise modified responsive to feedback regarding operational characteristics and performance measures associated with each respective candidate program. A candidate program may be generated (block 212) using the current grammar of rules and evaluated in accordance with predetermined criteria (block 213). Details of the operations depicted at blocks 212 and 213 are set forth below.

As indicated at decision block 290, a determination may be made regarding whether the generated candidate program is satisfactory or optimal. This determination may be relative (e.g., comparing a candidate program directly to another candidate program) or purely objective (e.g., measuring a candidate program in accordance with any of several predetermined criteria). The determination at decision block 290 may occur concomitantly or substantially simultaneously with the evaluation operation at block 213, and may be effectuated or facilitated by evaluator 130, either independently or in cooperation with one or more data processing systems or apparatus. In some embodiments, for example, a score or weight may be assigned to a candidate program during the evaluation operation; the determination at block 290 may include comparing such a score or weight against a predetermined threshold or some other objective measure.

In accordance with the FIG. 2 illustration, if a candidate program is deemed unsatisfactory or less than optimal based upon the determination at decision block 290, one embodiment of a generative programming method may selectively repeat the generating (block 212) and the evaluating (block 213) as indicated by the solid arrow looping back to block 212. Additionally or alternatively, a generative programming method may selectively repeat modifying the grammar (block 211), generating a candidate program using the current grammar (block 212), and evaluating the generated candidate program (block 213) as indicated by the dashed arrow looping back to block 211. In this exemplary embodiment, the current grammar may be selectively modified, for example, in accordance with feedback provided during, or subsequent to, the evaluation operation at block 213.

If the candidate program is deemed acceptable based upon the determination at decision block 290, it may be saved or otherwise recorded for future processing or use, transmitted or otherwise communicated to a suitable device, system, or other apparatus for further processing or use, or some combination of both (block 299). It will be appreciated that alternatives to the approach illustrated in FIG. 2 may have utility in numerous applications. For example, candidate programs found to be acceptable or superior in some respect, for instance, based upon the evaluation at block 213 or the determination at decision block 290, may specifically be selected to facilitate generation of focused grammars at block 211. In such an alternative implementation (not shown in FIG. 2 for clarity), the process illustrated in FIG. 2 may loop from block 299 back to block 211 for a predetermined number of iterations, or until a stopping criterion has been satisfied. Such selection of good or superior candidate programs for use in modification of grammars may occur in addition to, or in lieu of, the strategy of selecting candidate programs for that purpose depicted in FIG. 2.

Figure 3:
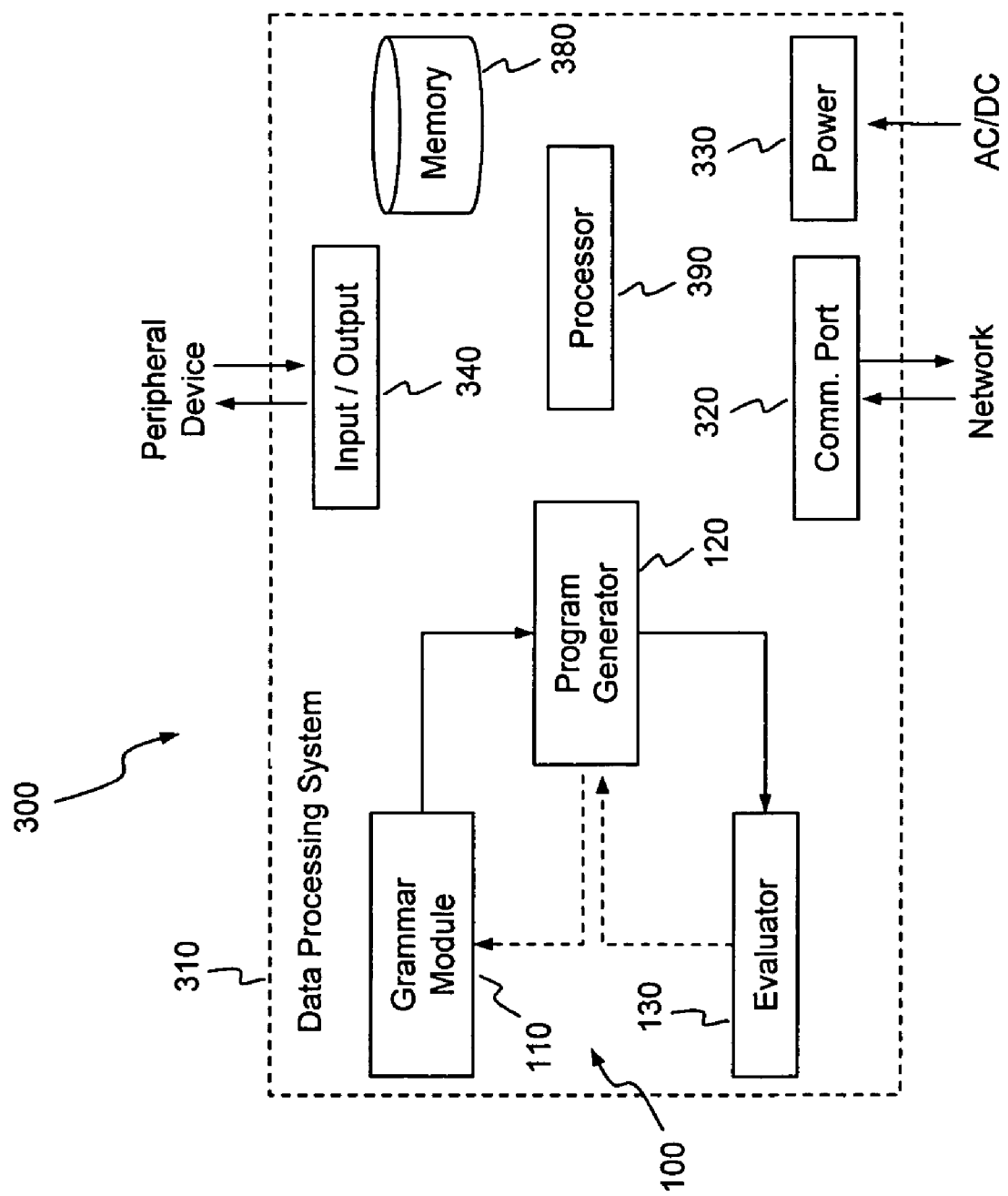
FIG. 3 is a simplified functional block diagram illustrating an exemplary environment in which elements of a generative programming system may be employed.

FIG. 3 is a simplified functional block diagram illustrating an exemplary environment in which elements of a generative programming system may be employed. Specifically, the components and operations set forth above with reference to FIGS. 1 and 2 may be employed or otherwise operative in conjunction with a computer environment 300 generally embodied in or comprising a digital computer or other suitable electronic data processing system (reference numeral 310 in FIG. 3). It will be appreciated that the FIG. 3 arrangement is presented for illustrative purposes only, and that processing system 310 may be implemented with any number of additional components, modules, or functional blocks such as are generally known in the electronic and data processing arts; the number and variety of components incorporated into or utilized in conjunction with processing system 310 may vary in accordance with, inter alia, overall system requirements, hardware capabilities or interoperability considerations, desired performance characteristics, or application specific factors.

In the exemplary FIG. 3 arrangement, processing system 310 may be embodied in a general purpose computing device or system (i.e., a personal computer (PC), such as a workstation, tower, desktop, laptop, or hand-held portable computer system). Computer servers, such as blade servers, rack mounted servers, multi-processor servers, and the like, may provide superior data processing capabilities relative to personal computers, particularly with respect to computationally intensive operations or applications; accordingly, processing system 310 may be embodied in or comprise such a server. It will be appreciated that generative programming techniques as set forth herein may be considered entirely hardware and software "agnostic," i.e., generative programming systems and methods as illustrated and described may be compatible with any hardware configuration, and may be operating system and software platform independent.

Processing system 310 generally comprises a processor 390, a data storage medium (memory 380), an input/output interface 340, a communications interface or port 320, and a power supply 330. As indicated in FIG. 3, processing system 310 may additionally comprise components of a generative programming system 100 (i.e., incorporating grammar module 110, program generator 120, and evaluator 130) such as described above with reference to FIG. 1, and may accordingly enable or facilitate the functionality thereof such as described above with reference to FIG. 2.

It will be appreciated that the various components, in various combinations, illustrated in FIG. 3 may be operably coupled, directly or indirectly, to one or all of the other components, for example, via a data bus or other data transmission pathway or combination of pathways (not shown). Similarly, power lines or other energy transmission conduits providing operative power from power supply 330 to the various system components are not illustrated in FIG. 3 for simplicity; these power lines may be incorporated into or otherwise associated with the data bus, as is generally known in the art.

In operation, processor 390 may execute software or other programming instructions encoded on a computer-readable storage medium such as memory 380, and additionally may communicate with program generator 120 to facilitate generation of candidate programs as set forth herein. In that regard, processor 390 may comprise or incorporate one or more microprocessors or microcomputers, and may include integrated data storage media (e.g., cache memory) operative to store data and instruction sets which influence configuration, initialization, memory arbitration, and other operational characteristics of processor 390.

It is generally well understood that any number or variety of peripheral equipment, such as a video display and a keyboard, for example, may be coupled to processing system 310 via interface 340 without inventive faculty. Examples of such peripheral devices include, but are not limited to: input devices; output devices; external memory or data storage media; printers; plotters; routers; bridges; cameras or video monitors; sensors; actuators; and so forth. User input, for example, affecting or influencing operation of the other components of processing system 310 may be received at interface 340 and selectively distributed to processor 390, program generator 120, evaluator 130, grammar module 110, memory 380, or some combination thereof.

Processing system 310 may be capable of bidirectional data communication via communications port 320. Accordingly, processing system 310 may have access to data resident on, or transmitted by, any number or variety of servers, computers, workstations, terminals, telecommunications devices, and other equipment coupled to, or accessible via, a network such as a local area network (LAN), a wide area network (WAN), a virtual private network (VPN), the internet, and so forth (i.e., any system or infrastructure enabling or accommodating bi-directional data communication between network-enabled devices).

From the foregoing, it will be appreciated that an initial, user-defined base grammar such as described above with reference to FIG. 2 may be received via communications port 320, for example, or accepted via interface 340.

Operation of program generator 120, grammar module 110, and evaluator 130 may be executed under control of, or in conjunction with, processor 390, data or instruction sets resident in memory 380, or some combination thereof. Specifically, processing system 310 may be configured and operative to enable the functionality set forth above with reference to FIGS. 1 and 2. It will be appreciated that while program generator 120, grammar module 110, and evaluator 130 are depicted as discrete elements in FIG. 3 for simplicity of description, some or all of their respective functionalities may be selectively combined or integrated, either with each other or with various other components of processing system 310.

For example, program generator 120, grammar module 110, and evaluator 130 (or some combination thereof) may be integrated into a single element or functional module, and may be embodied in a software application resident in memory 380, for instance, or in a hardware component such as an application specific integrated circuit (ASIC). With respect to hardware solutions, those of skill in the art will appreciate that field programmable gate arrays (FPGAs), programmable logic controllers (PLCs), programmable single electron transistor (SET) logic components, or combinations of other electronic devices or components may be implemented and suitably configured to provide some or all of the functionality of program generator 120, grammar module 110, and evaluator 130, either individually or in combination. Any selectively configurable or suitably programmable hardware element or combination of elements generally known in the art or developed and operative in accordance with known principles may be employed.

In one exemplary embodiment, evaluator 130 or its functionality may reside or otherwise be located external to processing system 310; in such an arrangement, the foregoing feedback communication and interoperability of program generator 120 and evaluator 130 may be enabled by, or facilitated with assistance from, processor 390 and communications port 320. This arrangement may have particular utility in instances where the capabilities (e.g., computational bandwidth, operating frequency, etc.) of processor 390 are limited relative to an external or otherwise dedicated data processing system (not shown in FIG. 3). Alternatively, the respective functionalities of evaluator 130 and program generator 120 may be incorporated into a single functional block or may otherwise be implemented in a coordinated manner as noted above with reference to FIG. 2; this arrangement may have particular utility, for instance, in situations where processing system 310, in general, and processor 390, in particular, are capable of handling heavy data processing loads and executing many floating point operations per second. In another alternative arrangement, the respective functionalities of grammar module 110 and program generator 120 may be incorporated into a single functional block, either embodied in a software or instruction set construct or in a hardware or firmware component.

The specific arrangement and particular implementation of a generative programming system 100 (such as exemplified by program generator 120, evaluator 130, and grammar module 110) within the environment of processing system 310 are susceptible of myriad variations. The present disclosure is not intended to be limited to any particular configuration or implementation (hardware versus software, for example) of generative programming system 100, or by the operational capabilities, structural arrangement, or functional characteristics of processing system 310.

It will be appreciated that the manner in which candidate programs are generated may differentiate various alternative generative programming methodologies. For example, in one embodiment, a method of randomly generating candidate programs from scratch may be used. From the starting rule node of a grammar, a production may be selected at random traversing non-terminal rule references, and terminals may be added until a valid parse tree has been formed. At this stage, performing a depth-first traversal of the parse tree may result in a program string. The foregoing approach is simple, clean, and fast; it also has shortcomings, however.

Specifically, in a purely random search strategy, an identified candidate program that is evaluated as performing well may not be utilized in further searches due to the random nature of the approach. Accordingly, a similar candidate program that may have exhibited superior performance characteristics may never have been considered, and consequently never identified, because a local search attempt (i.e., one in the neighborhood of the identified candidate program) was neither contemplated nor executed by the random search strategy. Random search methods generally do not explore the possibility that an identified candidate program may benefit from minor modifications. Consequently, a potentially superior candidate program may be overlooked, i.e., the possibility that such a superior candidate program even exists may be ignored. One hypothesis generally accepted by those of skill in the art attempts to improve upon the random method by adhering to the following tenet: good performing candidate programs tend to exist around or proximate to (i.e., in the general vicinity within the search space) other good performing candidate programs.

The foregoing hypothesis motivated modest advances in what have become known as genetic programming (GP) techniques. Briefly, GP methodologies search the program space by mimicking the processes of biological evolution. In that regard, an evolving set of candidate programs is treated like genetic material; promising programs are selected out of a program pool, subjected to cross-breeding through swapping of sub-trees, and experience random mutations through replacement of nodes. Candidate programs generated in the foregoing manner are reinserted into the pool of candidate programs with a probability of further selection assigned as a function of their fitness (as measured by one or more predetermined criteria). In direct contrast to the random approach set forth above, GP technology incorporates a localized search strategy, searching the area immediately proximate to good candidate programs by applying small changes to a collection of the best candidate programs previously identified. This strategy has utility to the extent that it thoroughly searches the local area around candidate programs previously identified as superior in some respect; the strategy is also deficient to the extent that the heuristic approach can get stuck in local minima for large numbers of "generations" of evolving candidate programs.

Given a particular problem to solve, a specific system or operating environment to control, or any other programming parameters (i.e., for any environment, system, or entity, the functional characteristics or operational behavior of which may be suitably defined or otherwise described by a grammar), generative programming techniques as illustrated and described herein may be employed, for instance, to determine specific function calls to make and to dictate a particular order in which to call the functions, to adapt free-parameters, to build custom algorithms, to curve-fit formulae, or to employ some appropriate combination thereof. Given sufficient computational bandwidth, one or more computer programs or other machine executable instruction sets may be rewritten, in real time, automatically to adapt to changes in operating conditions. By way of example and not by way of limitation, several applications which may benefit from generative programming methodologies are summarized below.

Designing—generative programming may be used to automate, partially or completely, design work involving structural, industrial, electrical, or other design optimization problems. In such applications, the goal is generally to find a design (whether structural, functional, or both) that performs best according to some objective engineering measurement including, but not limited to: lowest material cost; highest tensile or compressive strength; rigidity considerations; static, dynamic, or seismic load tolerances; ease of assembly or configuration; or some combination of the foregoing or other factors. Candidate design solutions may be generated from a grammar defining and interrelating, for example: material type, strength, and hardness; component or structural element shapes, sizes, masses, relative locations, and interconnections; electrical or electromagnetic properties of materials or components; functional characteristics of individual or interconnected elements, whether considered individually or in combination; expected operational envelopes and anticipated stresses on the system; or some combination of these or other factors. Some examples of designing applications may include, inter alia, engineering parts or system components, buildings or other structural designs, semiconductor layout, design, or manufacturing strategies, control system implementations, and property layouts.

Forecasting—time series forecasting applications generally seek to predict future values of a series with the lowest error rate possible. In accordance with the generative programming techniques set forth herein, candidate formulae may be generated from a grammar defining or otherwise describing characteristics of time series functions, for example, such as moving averages. Each candidate formula generated in accordance with the present system and method may be tested against how well it would have predicted values of the targeted series given a past or historical dataset. Some examples of such forecasting may include, among other things, sales forecasting, interest rate projections, market forecasting, economic outlooks, and real estate valuation forecasting.

Modeling—often, the mathematical expressions governing the behavior of physical systems are too computationally expensive to calculate or otherwise to solve directly. Instead, approximate models are sought to perform simulations in reasonable amounts of time. Generative programming may be employed to build approximate models of targeted environments. In such applications, candidate models may be generated from a grammar of rules describing or regulating motion or other dynamic aspects of the system. A candidate model may be scored against how accurately it models or approximates the underlying system in accordance with a set of known examples. Some modeling examples include, but are not limited to: protein folding dynamics; amino acid interactions; chemical reactions; wave propagation and other of two- or three-dimensional dynamic fluid flows; heat transfer problems; and nano-scale mechanics.

Optimizing—resource allocation dilemma generally seek solutions with the best, or optimal, trade-offs between possible resource outlays according to an objective function. In this context, generative programming methodologies may be employed to solve individual, ill-defined optimization problems with arbitrary objectives or to construct algorithms for solving many instances of optimization problems. In that regard, candidate solutions may be generated from a grammar defining or specifying repercussions of myriad resource usages. A candidate solution with the highest or lowest score (depending upon the directionality of the objective function) may be retained for further processing, later use, or to generate one or more focused grammars which may influence subsequent searches. Exemplary optimization applications include asset allocation and industrial or other automated control system problems.

Testing—testing is generally characterized by an attempt to validate (or to invalidate) assertions. Whether the assertions are that a product performs as claimed by the manufacturer or that it cannot be broken, a generative programming system and method may facilitate testing such assertions. In that regard, candidate tests may be generated from a grammar of rules defining the test environment and various selected parameters characterizing the expected or claimed behavior of the item or system under test. Some testing examples for which generative programming techniques may have utility include: software testing; hardware testing; design bashing or "myth busting;" and model testing.

From the foregoing, it will be appreciated that a new system and method of generative programming which employ focused grammars as described herein may have utility in myriad applications and may be susceptible of various application specific modifications. In accordance with an exemplary embodiment, candidate programs may be randomly generated by traversing a stochastic grammar. As described above with specific reference to FIG. 2, the grammar may not be static, i.e., throughout the process of identifying a suitable or optimal solution, the grammar may be modulated by feedback provided in accordance with performance of "improvement" or "modulating" programs. This alteration or modulation may refocus a current grammar or combination of grammars to steer subsequent candidate programs in the direction of promising areas of the search space.

Accordingly, utilization of focused grammars may enable generation of candidate programs similar to modulating programs, incorporating or facilitating a localized search strategy within the search space. During the search, a candidate program may be generated and evaluated, and grammars may be subsequently refocused, recursively, upon identification of better or more suitable candidate programs. Many such searches may be performed until some user-defined stopping criterion (such as a maximum number of iterations) is satisfied, for example, or until a satisfactory or optimal candidate program is otherwise identified in accordance with some predetermined objective goal.

Turning now specifically to grammars, it is noted that FIGS. 4 and 5 are simplified diagrams respectively illustrating one embodiment of a descriptive grammar and the general operation of one embodiment of a method which employs a grammar in generating a candidate program. It will be appreciated that the grammar of FIG. 4 (as well as those illustrated in subsequent drawing figures) is presented in Backus-Naur form (BNF). By way of background, BNF is a metasyntax commonly employed to notate grammars of computer programming languages, command or instruction sets, and communication protocols, as is generally known in the art. The BNF convention is employed herein, by way of example only, for the sake of clarity and to convey aspects of the inventive system and method in a readily understandable manner. Various other formats, structures, syntaxes, and representation styles for grammars may currently be employed or may be developed in the future; the present disclosure is not intended to be limited by any specific grammar syntax or by the particular format in which the grammars may be expressed.

As employed herein, the term "grammar" generally refers to a set of rules and associated productions provided or specified either in BNF or in some other suitable metasyntax or formatted representation. In that regard, a grammar, which specifies the generation or recognition of "sentences" for a given language, may define numerous variable parameters governing generation of a candidate program. The term "base grammar" generally refers to a user-defined grammar or to some predefined, user-specified, or initial grammar as described above with reference to FIGS. 2 and 3. Additionally or alternatively, the term base grammar may refer to a "focused grammar" that is to be combined with a "modulating program" in the process of forming a subsequent or additional focused grammar or base grammar.

The term "focused grammar" in this context generally refers to a grammar resulting from the combination of a base grammar and a modulating program; a focused grammar may be constructed and operative to generate candidate programs similar in some respect to the modulating program that was used to construct the focused grammar. As set forth in more detail below, a focused grammar may be constructed to include one or more additional productions (as compared to the base grammar) such as may be identified through decomposition of the modulating program; additionally or alternatively, a focused grammar may be generated simply by manipulating probabilities associated with the productions existing in the base grammar, i.e., without adding additional productions to the focused grammar. A focused grammar may be employed as a base grammar as noted above. It will be appreciated that the "similarity" between a given candidate program and a given modulating program may be measured in accordance with various criteria as set forth below.

As contemplated herein and as used to describe or to characterize programs or solutions, the term "similar" generally refers to a state of closeness, relatedness, or resemblance in terms of nature or character; "similarity" in this context may be measured or quantified in accordance with some readily ascertainable characteristic of each candidate program, modulating program, or solution. For example, string edit distance may be used to compare respective strings of respective candidate programs and to measure their similarity with respect to each other, for instance, or to compare their respective similarities to a modulating program. Programs or solutions that are considered similar to each other may generally be characterized as statistically similar, for example, as quantified by a string edit distance evaluation. As noted above, other mechanisms for determining similarity are generally known in the art, and may be application specific.

As employed herein, the term "sentence" generally refers to a string literal instance generated in accordance with the rules and productions prescribed or specified by a grammar; in the context of the present disclosure, a sentence is analogous to a candidate program or candidate solution generated in accordance with the rules and productions specified by a grammar.

It will be appreciated that the term "program" as employed herein is not intended to be interpreted in any limiting sense. Specifically, in the context of the present disclosure, a program may generally be characterized by (or refer to) executable programming code, for example, such as that typically embodying an application program, interface, applet, or other machine-executable instruction set. Additionally or alternatively, the term program also contemplates and encompasses other types of solutions such as may be articulated in or represented by a finite sequence of characters (e.g., a string literal instance generated in accordance with rules and productions specified by a grammar). Accordingly, a program may be embodied in, for example, and without limitation: executable or other instructions sets; various mathematical expressions, formulae, functions, or systems of equations; chemical descriptions, formulae, or expressions of functional physical or organic chemical relationships; mathematical or structural model representations; physical layouts (such as may be expressed, for example, in Verilog or other hardware description language (HDL) code describing semiconductor wafer and other silicon or hardware designs); or any other application specific solution that may be expressed as a finite string of characters generated by traversing a grammar as set forth herein. As noted generally above, in the context of the present disclosure, the term "solution" may be analogous to the term program; in that regard, this term generally shares the same scope as that set forth above with reference to the term program.

The term "modulating program" generally refers to a candidate program or candidate solution used to reshape or to focus a base grammar's probabilities, resulting in a focused grammar having probabilities focused toward generating additional candidate programs more similar to the modulating program than would be likely using the base grammar's probabilities. Again, relative similarity of programs may be determined in accordance with string edit distance, for example, or otherwise characterized in accordance with some other suitable measure.

Using an initial or base grammar (see, e.g., FIG. 4), a system and method of generative programming may generate a candidate program by randomly traversing the base grammar; this process may result in a valid and complete sentence or candidate program (see, e.g., FIG. 5). In that regard, a random number (e.g., a real number between 0.00 and 1.00 as indicated at the third column from the left in FIG. 5) may be generated, affecting the production selected for a particular rule in accordance with a respective probability for each permissible production. For example, at step 3 depicted in FIG. 5, a random number generation of 0.67 may result in selection of production 2 for the <assertion> rule (i.e., <assertion>=<description><conjunction> in FIG. 4) because the random number value, 0.67, is greater than 0.50. Similarly, at step 6 depicted in FIG. 5, a random number generation of 0.71 may result in selection of production 3 for the <description> rule (i.e., <description>="fun" in FIG. 4) because the random number value, 0.71, is between 0.50 and 0.75.

Values in the "Distance" column of FIG. 5 may generally be associated with the production probability set forth for each respective production indicated in FIG. 4, where distance=1/(production probability in base grammar). With respect to the <city> rule referenced at step 2, for example, the production "San Diego" has a probability of 0.33 as indicated in FIG. 4; accordingly, the distance (as indicated at step 2 in FIG. 5) is 1/0.33=3. Distances may be employed to focus subsequent grammars generated in accordance with the structure and nature of a modulating program as set forth in more detail below.

In the foregoing manner, a candidate program may be generated in accordance with a set of rules, productions, and associated probabilities such as set forth in FIG. 4 by traversing the grammar in a stepwise fashion such as depicted in FIG. 5. It will be appreciated that the rules and productions set forth in FIG. 4 are presented for illustrative purposes only and have been greatly simplified for ease of description with reference to FIG. 5. In many applications, such rules and productions associated with a complex grammar may involve function calls, variable definitions or initializations, table lookups or updates, and the like.

As noted above, a candidate program may be scored against user provided criteria or some other objective measure. In accordance with some embodiments of a system and method of generative programming, selected candidate programs (such as those scoring particularly well or performing especially well) may become modulating programs from which focused grammars may be generated as set forth above with reference to FIGS. 1-3; additionally or alternatively, some candidate programs may be selected as modulating programs without regard to performance evaluations. Specifically, a base grammar and a modulating program may be assembled, for example, by grammar module 110, program generator 120, or a combination of both; in combination, the base grammar and the modulating program may form a focused grammar facilitating generation of subsequent candidate programs in the neighborhood of the modulating program, i.e., relatively close (such as may be determined by a string edit distance evaluation, for instance) or proximate to the modulating program within the search space.

In accordance with some embodiments, the search through the space of possible candidate programs or solutions may be guided or generally directed by a "streak search method" as set forth in more detail below. Briefly, a streak search method may be employed to generate a number of candidate solutions from a base grammar (a base grammar may also be a focused grammar); candidate solutions or programs evaluated to have a score or other objective measure which improves upon the score of a modulating program may subsequently be used as modulating programs for recursive searching. As noted above, the term program encompasses solutions other than executable programming code; a streak search method as set forth herein may be employed to identify various types of candidate solutions using recursive searching techniques.

It will be appreciated that the foregoing process of employing a modulating program to refocus a base grammar is unique. In some applications, one objective may be to construct a new focused grammar that generates candidate programs that are similar to the modulating program. This methodology provides a mechanism for conducting local searches in the space of possible candidate programs proximate to those generated by a base grammar known to produce relatively good results.

In one exemplary embodiment, constructing a focused grammar may involve copying the base grammar into a new focused grammar, adding Automatically Defined Productions (ADPs) based upon a decomposition of the modulating program, and resealing affected productions probabilities. In that regard, ADPs may arise from or be characterized by Automatically Defined Variables (ADVs) or Automatically Defined Functions (ADFs), and may be identified during decomposition of the modulating program and a detailed analysis of the modulating program's parse tree substantially as set forth below.

Generally, focused grammars may be employed to reshape the probabilistic characteristics of a base grammar towards generating programs statistically similar to the modulating program as determined in accordance with a string edit distance measurement, for example, or using some other criteria. While such reshaping or refocusing may be achievable through simple, in situ alteration of the probabilities for the base grammar (i.e., without adding any new productions for rules existing in the base grammar), one potential side affect of such an approach may result in an inflated probability of generating longer programs, and thus greater string edit distances, as compared to the modulating program. Adding new productions (ADPs) to the base grammar (during the process of creating a focused grammar) may reduce, minimize, or eliminate the problem of increased program size.

In that regard, adding ADVs to a focused grammar may commonalize potentially useful sub-trees for reuse in the candidate program generated by traversing the focused grammar. For example, for each rule reference encountered during generation of a modulating program, a new production may be added (in a subsequently constructed focused grammar) to the rule being referenced. The right-hand side of the new production may be a single terminating token or string literal that results from a depth-first traversal of the modulating program's parse tree starting at the rule.

Similar to the advantages of adding ADVs to a focused grammar, adding ADFs to a focused grammar may commonalize potentially useful tree structures for reuse in a candidate program generated by traversing the focused grammar. For example, for each rule reference encountered during generation of a modulating program, for each combinatorial permutation of the sets created by each expansion of rule references in the rule's selected production, the permutation may be added as a new production to the rule. This explicates all of the function forms for each selected production. The foregoing strategy may add an exponential number of new productions to the focused grammar, however, and inserting a subset of the foregoing or other permutations may be a practical alternative to simplify the resulting focused grammar. For example, one such simplification may involve adding only those permutations that result from a single level of reference expanding; another approach may involve adding only the deepest expansions one level above terminating productions.

Exemplary results of the foregoing process of adding ADVs and ADFs to a base grammar (resulting in a focused grammar) are illustrated in FIG. 6. Specifically, FIG. 6 is a simplified diagram illustrating one embodiment of an equiprobable focused grammar.

The focused grammar depicted in FIG. 6 represents an alteration of a base grammar (illustrated in FIG. 4) modified with ADVs and ADFs selected in accordance with the structure and composition of a modulating program (in this instance, the candidate program illustrated in FIG. 5: "San Diego is hot, fun and beautiful"). Specifically, a decomposition of the modulating program may be employed to identify functions and variables for insertion into a focused grammar. In that regard, the numbers in the ADV and ADF columns in FIG. 6 represent, respectively, the step (see FIG. 5) during generation of the modulating program at which the rule that gave rise to a respective ADV or ADF was referenced. It will be appreciated that the columns designated "ADV" and "ADF" in FIG. 6 (i.e., the second and third columns, respectively, from the left) are provided for demonstrative purposes only. Neither the columns themselves, nor the data represented therein, are necessary for construction or implementation of focused grammars.

By way of example, the <assertion> rule of FIG. 6 has been modified to include an ADV production ("hot, fun and beautiful") corresponding to the <assertion> (referenced at step 3 in FIG. 5) which was ultimately generated at steps 3 through 8 during generation of the modulating program (i.e., <assertion>="hot, fun and beautiful"). Specifically, based upon the random numbers generated and the productions selected in generating the candidate program of FIG. 5, the <assertion> rule originally produced <description><conjunction> (step 3); the first <description> produced "hot" (step 4), and the first instance of the <conjunction> rule produced "," <description><conjunction> (step 5); the second <description> produced "fun" (step 6), and the second instance of the <conjunction> rule produced "and" <description> (step 7); finally, the third <description> produced "beautiful" (step 8).

Additionally, the <assertion> rule of FIG. 6 has also been modified to include an ADF production (<description> "," <description><conjunction>) corresponding to the operations depicted at steps 3 and 5 during generation of the modulating program. Specifically, the <assertion> rule (referenced at step 3 in FIG. 5) originally produced <description><conjunction> (step 3), where and the first instance of the <conjunction> rule produced "," <description><conjunction> (step 5). Similarly, the <city description> rule of FIG. 6 has also been modified to include an ADF production corresponding to the rule reference at step 1. During generation of the modulating program, the <assertion> rule eventually produced <description><conjunction> as indicated at step 3 in FIG. 5; the <city description> rule of FIG. 6 has been modified to reflect this new production. As indicated in FIG. 6, the <conjunction>, <city>, and <description> rules may be similarly modified in accordance with decomposition of the modulating program, for example, or in accordance with user specified criteria.

As noted above, a method of generating or creating a focused grammar may involve rescaling or refactoring affected productions' probabilities. The simplest refactoring scheme generally involves setting all production probabilities for a particular rule in the resulting focused grammar to be equiprobable, as depicted in FIG. 6. For every rule receiving an ADV, an ADF, or both, the new total number of productions for that rule may be divided into one, resulting in equal probabilities for each production. One potential drawback of such an approach, however, may be a relatively high probability associated with reusing the strings for large sub-trees resulting in greater string edit distances representing less similarity with the modulating program.

One example of a more balanced approach may generally comprise utilizing one or both of a pair of focused grammars which are not equiprobable. In that regard, FIG. 7 is a simplified diagram illustrating one embodiment of a focused grammar shaped for reuse, and FIG. 8 is a simplified diagram illustrating one embodiment of a focused grammar shaped for similar termination, for example, with respect to a modulating program. ADPs may be added to the focused grammars of FIGS. 7 and 8 substantially as set forth above with reference to FIG. 6. As in FIG. 6, the numbers in the ADV and ADF columns of FIGS. 7 and 8 represent, respectively, the step during generation of the modulating program at which the rule that gave rise to a respective ADV or ADF was referenced—these columns are provided for illustrative purposes only, and have bearing neither on the creation of focused grammars nor on the operability thereof.

While the following description addresses one embodiment which utilizes both the FIG. 7 focused grammar and the FIG. 8 focused grammar in cooperation, it will be appreciated that any of the focused grammar embodiments illustrated in FIGS. 6-8 may be employed individually during creation of a candidate program similar to a modulating program. Specifically, the focused grammars depicted in FIGS. 6-8 represent several exemplary alternative methodologies by which production probabilities may be calculated. Even when considered alone, for instance, any one of the embodiments of a focused grammar illustrated in FIGS. 6-8 may be effectively implemented to generate candidate programs.

In accordance with a multi-phase or multi-stage embodiment, a "first phase" grammar (such as that illustrated in FIG. 7, for example) may be constructed to include production probabilities which are focused so as to generate large chunks of the candidate program. Conversely, a "second phase" grammar (such as that illustrated in FIG. 8, for example) may be constructed to include production probabilities which are focused specifically to terminate the generation of new candidate programs more rapidly (e.g., with respect to total string edit distance or some other objective measure) than the first phase grammar. In accordance with this strategy, generating a candidate program may be characterized by a two-phased process, though additional phases may be possible as well. A first phase focused grammar may be employed to generate a new candidate program until an ADP is visited, at which point, a second phase focused grammar may be employed to complete the candidate program, if necessary.

Values in the "Distance" column (such as depicted in FIGS. 7 and 8) may be computed in a number of different ways; in some embodiments, the manner in which a distance for a particular production is computed may depend, for example, upon the type of production being considered or other factors. Focused grammars, as noted above, may be generated by appending to, or inserting into, a base grammar additional productions identified through decomposition of a modulating program; accordingly, some or all of the productions that exist in the base grammar may be copied, without modification, into the focused grammar. In FIGS. 7 and 8, for example, the first two productions for the <assertion> rule, the first two productions for the <conjunction> rule, and the first four productions for the <description> rule (and so forth) may be characterized as productions existing in the base grammar (FIG. 4).

Where distance is defined as the reciprocal of a given production probability in the base grammar, probabilities for some first phase ADPs may be calculated by subtracting the total distance of the sub-trees from the total distance of the modulating program; conversely, probabilities for some second phase ADPs may be calculated simply by summing the total distance of each respective sub-tree. These strategies are described by way of example and not by way of limitation in more detail below.

While other possibilities are contemplated, the distance for productions existing in the base grammar may be defined in the focused grammar in the same manner as in the base grammar, where distance may generally be expressed as the reciprocal of a given production's probability in the base grammar, i.e., distance=1/(production probability in base grammar), as set forth above. For example, the "hot" production for the <description> rule in the base grammar of FIG. 4 has a production probability of 0.25, resulting in a distance (for that production) of 4 in FIGS. 7 and 8. Similarly, the "Los Angeles" production for the <city> rule in the base grammar of FIG. 4 has a production probability of 0.33, resulting in a distance (for that production) of 3 in FIGS. 7 and 8.

In some embodiments, an ADF may be assigned the same distance as the production from which it arose. The original distance, i.e., 1/(production probability in base grammar), may be employed for both reuse (FIG. 7) and termination (FIG. 8) focused grammars, in part, because this type of ADP may effectively result in similar string edit distances as the base grammars, rather naturally. Examination of FIGS. 7 and 8 with reference to FIG. 4 illustrates that each ADF may be assigned the same distance as the originating production for the corresponding rule. Specifically, the ADF inserted for the <assertion> rule in FIGS. 7 and 8 has been assigned the same distance (2=1/0.5) as the productions for the <assertion> rule in FIG. 4, each of which has a production probability of 0.5 in the base grammar.

Additionally or alternatively, distance may be assigned to an ADV in accordance with a more complicated strategy, depending upon the desired or required nature of the focused grammar. For a reuse grammar such as illustrated in FIG. 7, a distance for an ADV may be calculated by subtracting a sub-tree distance for the ADV from the whole modulating program distance. For example, a distance for reuse grammar ADV-5 (i.e., ", fun and beautiful" in FIG. 7) may be computed as follows:

[program distance]−[sub-tree distance]=[sub-tree from step 1 in FIG. 5]−[sub-tree from step 5 in FIG. 5]=[22]−[2+4+2+4]=10

Conversely, in a termination grammar such as illustrated in FIG. 8, a distance for an ADV may simply be designated as the sub-tree total distance. For example, a distance for termination grammar ADV-5 (i.e., ", fun and beautiful" in FIG. 8) may be computed as follows:

[sub-tree distance]=[sub-tree from step 5 in FIG. 5]= [2+4+2+4]=12

The "1/Distance" column is self-explanatory in FIGS. 7 and 8. Values for this column may be computed simply by inverting the distance value for the production under consideration. For example, distance 12 becomes 1/12=0.0833.

As generally depicted in FIGS. 7 and 8, the values in the "Production Probability" column are derived from the values in the "1/Distance" column having been rescaled back to 1 for each rule. In particular, the sum of all production probabilities for a given rule may be made equal to 1. Accordingly, all the values in the "1/Distance" column for a particular rule may be summed; the "1/Distance" value for each respective production may be divided by that sum to compute the rescaled "Production Probability" value for each respective production. For example, rescaling the <assertion> rule for the termination grammar in FIG. 8 results in a sum of the "1/Distance" values as follows: 0.500+0.500+0.500+0.063=1.563. The first three productions (each having a "1/Distance" value of 0.500) will be assigned a production probability of 0.500/1.563=0.320. The ADV added during step 3 may be assigned a new production probability of 0.063/1.563=0.040.

As described above, focused grammars may generally be characterized as stochastic grammars, employed in local search strategies and focused in the direction of a modulating program. The parse tree of a modulating program (usually representing an improvement identified during a search) may be inserted into two copies of the base grammar to form a new pair of focused grammars with different production probabilities as described above. In one exemplary alternative to the embodiment described above, a pair of focused grammars may be used in combination to generate programs in the neighborhood of the modulating program as follows:

the stochastic base grammar may be copied into two grammars: a first phase; and a second phase.

for every rule reference in the modulating program, add the string resulting from a depth-first traversal of the modulating program's parse tree from the selected rule as a terminal string in a new production inserted into the corresponding rule of both focused grammars. This adds the explicit possibility of automatically defined variables (ADVs).

for every rule reference in the modulating program, add a new production to the corresponding rule of both focused grammars with the right-hand side elements from the modulating program's parse tree as visited during a depth-first traversal, using the rule reference when visiting terminal strings instead of the strings themselves. This adds the explicit possibility of automatically defined functions (ADFs).

calculate the total distance of the modulating program from its starting non-terminal.

for each production added during the operations above, assign a new probability in accordance with distance substantially as set forth above.

for each rule, rescale the production probabilities such as, for example, as set forth above.

In accordance with this embodiment and as indicated in FIGS. 7 and 8, the difference between a first phase and a second phase grammar may be manifest in the new production probabilities. When generating a new candidate program using the first phase grammar, productions more similar to the whole modulating program have higher probabilities. This may be desirable, for example, until one of the newly added productions has been traversed. If traversal of the first phase grammar were continued from this point, the first phase focused grammar may exhibit a strong tendency to append good-sized portions of the modulating program end-to-end. The resulting candidate program would not likely reside in the neighborhood of the modulating program. After one of the newly added productions has been traversed using the first phase grammar, candidate program construction may be completed using the second phase grammar. The probabilities of the second phase grammar may reflect the total distance of the variable or function, which is inline with the original probability of having traversed that particular sequence.

In accordance with another embodiment, a single phase system and method of generative programming may employ focused grammars involving ADVs, ADFs, or both. As noted above, forcing equiprobable productions (FIG. 6) is the simplest method of assigning production probabilities for a newly generated focused grammar. A slightly more involved strategy may seek to tune the probabilities towards generating neighboring candidate programs with respect to distance as well. Two such approaches may tune or focus probabilities substantially as described above with reference to FIGS. 7 and 8. Specifically, any one of the exemplary embodiments of FIGS. 6-8, as well as various other implementations, may be suitable for a single phase generative programming strategy.

In that regard, it will be appreciated that potentially more accurate or otherwise more appropriate strategies for assigning probabilities to productions for affected rules may exist. In one such strategy, which is possible, but far more complicated than the mechanisms set forth above, the goal is to assign probabilities to the productions such that the string edit distance between the modulating program and the candidate programs generated by the focused grammar grows with a diminishing probability. This problem may be cast into an optimization formulation in order to solve for the unknown probabilities.

As set forth in detail above, a focused grammar may be constructed by adding ADPs identified through decomposition of a modulating program; in some alternative implementations, a focused grammar may be generated simply by manipulating probabilities associated with the productions existing in the base grammar (e.g., selectively increasing, decreasing, or otherwise adjusting the probabilities of productions traversed during the generation of the modulating program) without adding additional productions to the focused grammar. In one embodiment employing increased production probabilities, generating a candidate program may involve selectively decaying or biasing the increased probabilities back toward the corresponding probabilities prescribed in the original base grammar; such dynamic alteration or selective manipulation of production probabilities during generation of a candidate solution may minimize or eliminate the possibility of generating candidate programs that exist far away from (i.e., are not likely to be similar to) the modulating program.

With reference to FIG. 4, for example, a base grammar's <assertion> rule may generally be represented as follows:

| <assertion> | = | <description> | 0.50 |
| | \| | <description> <conjunction> | 0.50 |
| | ; | | |

A probability for production 2 may be selectively adjusted, such as increased or boosted, because production 2 was visited during construction of the modulating program as set forth above with reference to FIG. 5. In such an embodiment employing selectively boosting probabilities, an initial state of a focused grammar through boosting may be expressed as follows:

| <assertion> | = | <description> | 0.25 |
| | \| | <description> <conjunction> | 0.75 |
| | ; | | |

After production 2 has been traversed during construction of a subsequent candidate program, the boosted production may be decayed back toward the base grammar's original production probability as described above. In accordance with various decay strategies, a given production probability may be reset immediately to the original production probability (for example, in a single operation), or may be manipulated to approach the original production probability gradually (for example, in a step-wise or other incremental fashion which may include intermediate steps).

As noted briefly above, the streak search method may be characterized as a way of conducting a search for programs or other solutions. While described below with specific reference to "programs," a streak search method may be employed to identify various types of solutions (such as formulae, chemical structures, systems of equations, etc.) as set forth above. In particular, such a method generally seeks to strike a balance between the need to explore the local area (i.e., proximate to a good candidate program or modulating program) and the need to move on to a different portion of the search space when further local improvement is not likely. In accordance with one embodiment, a streak search method may begin with identification or selection of a valid "basis" program (a candidate program or a modulating program). A set of relatively local (or similar), alternative candidate programs may be generated from focused grammars modulated or altered in accordance with the basis program. These alternative candidate programs may then be evaluated. A candidate program scoring well with respect to a desired objective function may become a new modulating program for a new local set of candidate programs.

Each candidate program in the new local set, in turn, may become a modulating program for further searches. The foregoing process may continue recursively; the search may terminate when satisfactory results have been obtained or a predetermined period of time has elapsed. In effect, as better candidate programs are identified, the search continues in the direction of improvements. At some point, for example, when further local improvements are unlikely or when additional improvements have not been made for a predetermined number of iterations, the streak may be abandoned, and the search may begin anew with a different basis program.

In operation, a program generator 120 such as described above with reference to FIGS. 1 and 3 may employ one focused grammar or a plurality of focused grammars to generate new candidate programs similar (when taken over large numbers of constructed candidate programs) to the modulating program used to construct the focused grammars. In some embodiments, program generator 120 may implement a two phase process or other multi-phase process. In that regard, program code or other computer executable instruction sets may enable program generator 120 randomly to traverse (according to probabilities) a first phase focused grammar, constructing a new candidate program parse tree until one of the new productions has been traversed; upon traversal of the first new production, program generator 120 may continue using the second phase focused grammar until a complete parse tree has been constructed. Alternatively, various types of sophisticated focused grammars such as described above may be employed in a single phase operation.

It will be appreciated that the computer or machine executable language expressing the programs or solutions may be an important consideration in any computer application. For example, compiled languages may not be well suited for generative programming techniques because the extra time required to make an executable, plus the time to execute the resulting candidate program, can easily exceed the time it would have taken simply to interpret the program. In addition, traditional languages were designed for human programmers to read, to write, and to analyze efficiently and quickly. Relative to the minimal requirements of a machine-readable language, conventional programming languages inject unnecessary syntax, redundant constructs, lengthy code segments, and sometimes even ambiguities.

It will be appreciated that an interpreted language may be more suitable for generative programming methodologies than overbearing compiled languages. In some embodiments employing an interpreter optimized for use with an interpreted language, for example, in conjunction with evaluator 130, a system and method of generative programming may simply execute generated candidate programs without the processing overhead and time associated with compiling.

Accordingly, a new language was designed specifically for use with generative programming methodologies. The Stack Manipulation Language (SML) is an interpreted language designed to be simple, easy, fast, and as a result, not necessarily human friendly. SML generally comprises a set of stacks (one for each data type), a set of global variables (one for each data type—generally identified by a string key), a set of functions, and an interpreter (such as may be executable by evaluator 130, either independently or in cooperation with program generator 120, processor 390, or both). The stacks may be available to, and used directly by, the user-defined functions. Moreover, the functions themselves may be responsible for obtaining the data required from the stacks and pushing produced results back onto the stacks. User-defined functions may be registered under a function name and may be used according to the following form:

functionname(nested function calls)

or functionname{construction argument}(nested function calls)

The construction string may then be used for persistence purposes; it is passed into the function object during the construction phase. An interpreter running on evaluator 130, for example, may parse a program string as a sequence of function calls, and subsequently execute each function call in turn when invoked.

Figure 9:
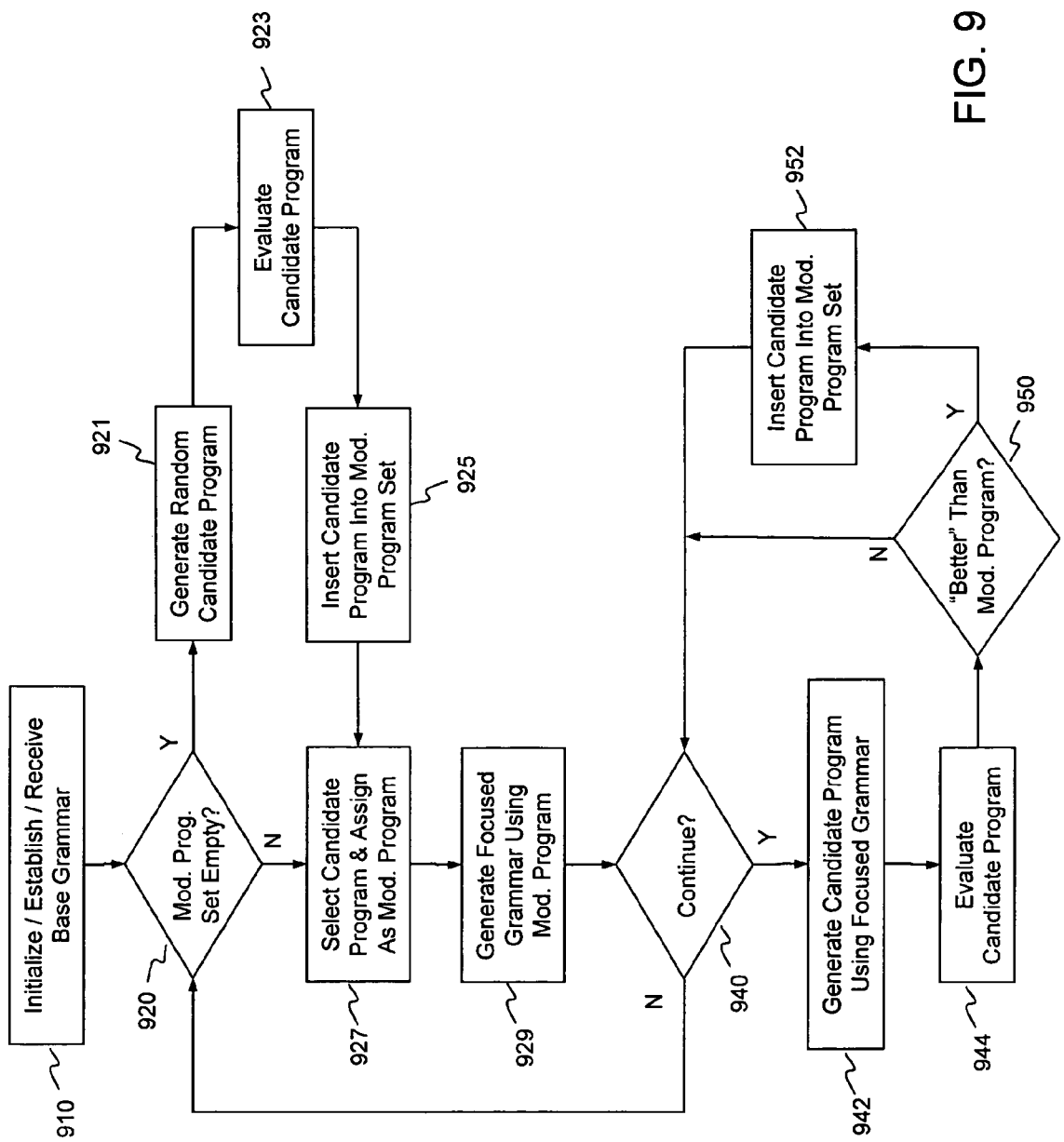
FIG. 9 is a simplified flow diagram illustrating the general operational flow of one embodiment of a generative programming method.

Turning now to FIG. 9 in light of the foregoing description, it will be appreciated that a method of generative programming represents a revolution in symbolic regression and recursive analysis. In particular, FIG. 9 is a simplified flow diagram illustrating the general operational flow of one embodiment of a generative programming method.

A base grammar may be initialized, established, or otherwise received in accordance with user input as indicated at block 910. If a modulating program set is empty (i.e., no modulating program currently exists), a determination at decision block 920 may result in generation of a candidate program as indicated at block 921; as described above, the operation at block 921 may generate a candidate program (see, e.g., FIG. 5) in accordance with rules, productions, and respective probabilities prescribed by the base grammar supplied at block 910 (see, e.g., FIG. 4). In that regard, a program generator (such as described above with reference to FIGS. 1 and 3) may be configured and operative to generate a candidate program by traversing a grammar and constructing or assembling a string literal instance in accordance with the rules, productions, and probabilities specified therein.

The candidate program may be executed and evaluated (block 923) in accordance with predetermined criteria or objective measures. This operation may be facilitated by an evaluator, an interpreter, or both substantially as described above. In that regard, it will be appreciated that an evaluator (such as described above with reference to FIGS. 1 and 3) may be configured and operative to execute the candidate program in a simulated environment and to determine, quantify, or otherwise to evaluate its performance or other characteristics. Such execution of the candidate program may benefit from use of an interpreted programming language; an evaluator may employ or otherwise be operative in cooperation with an interpreter for this purpose. Alternatively, candidate programs may be compiled and executed in accordance with the requirements of one or more compiled programming languages; such implementations may be appropriate for applications having strict compatibility requirements, for example, or in instances where data processing capabilities are not limiting.

It will be appreciated that various methods of evaluating a candidate program objectively, as well as techniques for assigning a score or weight to a candidate program, are generally known and are typically application specific—the present disclosure is not intended to be limited to any particular evaluation scheme or scoring methodology with respect to the operations depicted at block 923 and block 944 (described below).

The candidate program may be inserted into the modulating program set (block 925). In some embodiments, the candidate program may be inserted into the modulating program set along with data associated with its evaluation (i.e., a score, rank, or other distinguishing objective tag) such that a plurality of candidate programs in the modulating program set may be ranked or otherwise identified in accordance with performance characteristics. Alternatively, the candidate program may be inserted into the modulating program set without associated data representative of its score or otherwise without regard for evaluation information; in such an embodiment, candidate programs may be inserted into and selected from the modulating program set randomly, for example, or on a first-in-first-out basis, on a first-in-last-out basis, or in accordance with some other desired arbitration strategy.

A candidate program may be selected from the modulating program set and assigned as a current modulating program (block 927); one or more focused grammars may be generated from the current modulating program and the current base grammar (block 929) substantially as described above with reference to FIGS. 4-8.

For a predetermined number of iterations, or until a user-defined or automatically generated stopping rule is satisfied, a determination may be made at decision block 940 repeatedly to generate candidate programs using one or more focused grammars (block 942) and to evaluate those generated candidate programs (block 944). The loop at the bottom of FIG. 9 generally represents a local search methodology employed by one embodiment of the streak search technique described above. Programs that are "better" (i.e., more suitable or otherwise deemed more appropriate in accordance with the evaluation at block 944) than the current modulating program as determined at decision block 950 may be inserted into the modulating program set (block 952) for subsequent selection and assignment as a modulating program from which additional or subsequent localized searches may be derived.

When a determination is made at decision block 940 that a current iterative loop may or should be terminated, such as when additional improvements are no longer likely, or following a specified number of iterations, the current streak may end, and the modulating program set may be examined again as indicated by the solid arrow looping back to decision block 920.

In the foregoing manner, localities in the search space proximate to promising candidate solutions may be examined thoroughly as the search is recursively focused in accordance with modified grammars influenced by candidate solutions previously evaluated to be superior in some respect.

It will be appreciated that the arrangement of the functional blocks depicted in FIG. 9 is susceptible of numerous variations, and is not intended to suggest an order of operations to the exclusion of other possibilities. For example, the loop at the top of FIG. 9 (from decision block 920 down to decision block 940), may continue in parallel with the loop of operations at the bottom of FIG. 9 (from decision block 940, through decision block 950, and back to decision block 940). Additionally or alternatively, multiple instances of the loop of operations depicted at the bottom of FIG. 9 may be executed in parallel, for example, or otherwise substantially simultaneously or concomitantly; such an embodiment may take advantage of parallel processing and other increasing capabilities of multitasking high-speed computers or data processing systems.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of generative programming; said method comprising:
    receiving a stochastic grammar defining variable parameters;
    generating a candidate program using said grammar;
    evaluating said candidate program in accordance with predetermined criteria; selectively repeating said generating and said evaluating;
    designating a particular candidate program as a modulating program responsive to evaluating;
    modifying a structure and a production probability of said grammar based upon a decomposition of terminal and non-terminal nodes of said modulating program; and
    focusing results of subsequent iterations of said generating in accordance with said modifying.

2. The method of claim 1 further comprising selectively repeating said generating, said evaluating, said designating, said modifying, and said focusing until an optimal candidate program is identified in accordance with said evaluating.

3. The method of claim 1 wherein said evaluating comprises executing said candidate program and assigning a score.

4. The method of claim 3 wherein said executing comprises employing an interpreter.

5. The method of claim 3 wherein said designating is executed in accordance with said assigning.

6. A method of generative programming utilizing focused grammars said method comprising:
    receiving a stochastic grammar defining variable parameters;
    generating candidate programs using said grammar;
    evaluating said candidate programs in accordance with predetermined criteria; responsive to said evaluating, designating a particular candidate program;
    modifying, using said particular candidate program, a structure and a production probability of said grammar to focus results during subsequent iterations of said generating, wherein said modifying is based upon a decomposition of terminal and non-terminal nodes of said particular candidate program, wherein said modifying comprises adding a production and altering a production probability; and selectively repeating said generating, said evaluating, and said modifying.

7. The method of claim 6 further comprising continuing said selectively repeating until an optimal candidate program is identified in accordance with said evaluating.

8. The method of claim 6 wherein said evaluating comprises executing said candidate programs and assigning each a respective a score.

9. The method of claim 8 wherein said executing comprises employing an interpreter.

10. A computer-readable medium encoded with data and instructions for enabling generative programming utilizing focused grammars; the data and instructions causing an apparatus executing the instructions to:
    receive a stochastic grammar defining variable parameters;
    generate a candidate program using said grammar;
    evaluate said candidate program in accordance with predetermined criteria;
    designate a particular candidate program as a modulating program ill accordance with results of the evaluation; and
    create a focused grammar to focus results during subsequent iterations of generating a candidate program, wherein said focused grammar is created based upon a decomposition of terminal and non-terminal nodes of said modulating program and includes at least an additional production and a different production probability as compared to said grammar.

11. The computer-readable medium of claim 10 further encoded with data and instructions; the data and instructions further causing an apparatus executing the instructions to implement said focused grammar to generate an additional candidate program that is similar to said modulating program.

12. A generative programming system; said system comprising:
    a grammar module operative to establish a stochastic grammar;
    a program generator operative to generate a candidate program in accordance with said grammar;
    an evaluator operative to evaluate said candidate program in accordance with predetermined criteria; wherein said grammar module is operative to modify said grammar using a modulating program designated in accordance with results of the evaluation, the modifications based upon a decomposition of terminal and non-terminal nodes of said modulating program and including at least a structural modification and a probability modification to focus results during subsequent iterations of generating a candidate program; and
    an electronic device enabling the functionality of said grammar module, said program generator, and said evaluator.

13. The system of claim 12 wherein said evaluator is further operative to execute said candidate program in a simulated environment and to assign a score to said candidate program.

14. The system of claim 13 wherein said evaluator comprises an interpreter operative in accordance with an interpreted programming language.

15. The system of claim 13 wherein said evaluator is further operative to provide data associated with an evaluation to said program generator.

16. The system of claim 15 wherein said program generator is further operative to provide said data to said grammar module.

17. The system of claim 16 wherein said grammar module is further operative to modify said grammar responsive to said data.

18. The system of claim 13 wherein the structural modification includes an additional production.

19. The system of claim 13 wherein the probability modification includes a different production probability.

* * * * *

UNITED STATES PATENT AND TRADEMARK OFFICE
CERTIFICATE OF CORRECTION

PATENT NO. : 7,577,935 B2  Page 1 of 1
APPLICATION NO. : 11/045928
DATED : August 18, 2009
INVENTOR(S) : Matthew T. Reynolds It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this

Seventh Day of September, 2010

David J. Kappos
*Director of the United States Patent and Trademark Office*